US012591655B2

(12) United States Patent
Quinlan et al.

(10) Patent No.: US 12,591,655 B2
(45) Date of Patent: Mar. 31, 2026

(54) SYSTEMS AND METHODS OF PROTECTING SECRETS IN USE WITH CONTAINERIZED APPLICATIONS

(71) Applicant: Visa International Service Association, San Francisco, CA (US)

(72) Inventors: Michael Joseph Quinlan, San Francisco, CA (US); Ajit Gaddam, San Francisco, CA (US); Rashmi Krishnan, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 162 days.

(21) Appl. No.: 18/552,877

(22) PCT Filed: Mar. 29, 2022

(86) PCT No.: PCT/US2022/022372

§ 371 (c)(1),
(2) Date: Sep. 27, 2023

(87) PCT Pub. No.: WO2022/212396

PCT Pub. Date: Oct. 6, 2022

(65) Prior Publication Data

US 2024/0193255 A1 Jun. 13, 2024

Related U.S. Application Data

(60) Provisional application No. 63/167,459, filed on Mar. 29, 2021.

(51) Int. Cl.
*G06F 21/44* (2013.01)
*G06F 9/455* (2018.01)
(Continued)

(52) U.S. Cl.
CPC .......... *G06F 21/44* (2013.01); *G06F 9/45558* (2013.01); *G06F 21/53* (2013.01);
(Continued)

(58) Field of Classification Search
CPC ..... H04L 63/10; H04L 63/102; H04L 63/108; H04L 63/105; H04L 63/08;
(Continued)

(56) References Cited

U.S. PATENT DOCUMENTS

| | | | | |
|---|---|---|---|---|
| 10,303,899 | B2 * | 5/2019 | Durham | .................... G06F 8/63 |
| 10,621,350 | B2 * | 4/2020 | Novak | ................ H04L 63/0823 |

(Continued)

FOREIGN PATENT DOCUMENTS

WO     2020260864 A1     12/2020

OTHER PUBLICATIONS

Application No. PCT/US2022/022372 , International Search Report and Written Opinion, Mailed On Jul. 13, 2022, 10 pages.
(Continued)

*Primary Examiner* — Tae K Kim

(74) *Attorney, Agent, or Firm* — Kilpatrick Townsend & Stockton LLP

(57) ABSTRACT

Data encryption keys (and other sensitive data) can be secured during use by a key protection service that performs cryptographic operations on behalf of a client application. The key protection service can be implemented as a lightweight virtual machine that appears externally as a container and that can be executed in a secured environment. The lightweight virtual machine can include containerized processes to support an application program interface to interact with the client application and an attestation client to interact with a secured key storage system external to the secured environment.

18 Claims, 6 Drawing Sheets

(51) Int. Cl.
  *G06F 21/53* (2013.01)
  *G06F 21/62* (2013.01)
  *H04L 9/08* (2006.01)
  *H04L 9/32* (2006.01)
(52) U.S. Cl.
  CPC ........ *G06F 21/6218* (2013.01); *H04L 9/0894* (2013.01); *H04L 9/3271* (2013.01); *G06F 2009/45587* (2013.01)
(58) Field of Classification Search
  CPC ....... H04L 63/0876; H04L 9/08; H04L 9/088; H04L 9/0897; H04L 9/0894; H04L 9/32; H04L 9/3234; H04L 9/3239; H04L 9/3236; H04L 9/3271; H04L 9/3273; G06F 21/575; G06F 21/577; G06F 21/57; G06F 21/50
  See application file for complete search history.

(56) References Cited

U.S. PATENT DOCUMENTS

| | | | |
|---|---|---|---|
| 2009/0172781 A1 | 7/2009 | Masuoka et al. | |
| 2014/0089658 A1* | 3/2014 | Raghuram | G06F 9/45533 |
| | | | 380/278 |
| 2014/0289535 A1* | 9/2014 | Gan | H04L 9/32 |
| | | | 713/189 |
| 2016/0087995 A1 | 3/2016 | Gehrmann et al. | |
| 2018/0004954 A1* | 1/2018 | Liguori | H04L 9/14 |
| 2018/0181756 A1* | 6/2018 | Campagna | H04L 9/088 |
| 2018/0183578 A1* | 6/2018 | Chakrabarti | H04L 9/0861 |
| 2020/0136822 A1* | 4/2020 | Villapakkam | H04L 9/0894 |
| 2020/0220713 A1* | 7/2020 | Li | H04L 9/14 |
| 2021/0397698 A1* | 12/2021 | Li | H04L 9/3263 |
| 2022/0222099 A1* | 7/2022 | Srivastava | G06F 9/45545 |
| 2022/0222100 A1* | 7/2022 | Srivastava | G06F 9/5077 |

OTHER PUBLICATIONS

Advaned Micro Devices, Inc., "AMD SEV-SNP: Strengthening VM Isolation with Integrity Protection and More", AMD, Jan. 2020, pp. 1-20.
Larrew , "[kata-dvv] Kata with AMD SEcure Encrypted Virtualization (SEV)", https://openstack.org; located at https://lists.katacontainers.io/pipermail/kata-dev/2018-February/000029.html, Feb. 21, 2018, 4 pages.
Application No. SG11202307070Y, Notice of Decision to Grant, Mailed on Jan. 23, 2026, 4 pages.

* cited by examiner

*100*

*500*

Receive request from client app via API — *502*

Connect to key storage system using attestation client; request data encryption key(s) — *504*

Receive attestation challenge from key storage system — *506*

Respond to attestation challenge — *508*

Receive data encryption key(s) from key storage system — *510*

Store key(s) in secure memory — *512*

Use key(s) to respond to client requests — *514*

SYSTEMS AND METHODS OF PROTECTING SECRETS IN USE WITH CONTAINERIZED APPLICATIONS

CROSS-REFERENCE TO RELATED APPLICATIONS

This application claims priority to U.S. Provisional Application No. 63/167,459, filed Mar. 29, 2021, the disclosure of which is incorporated herein by reference.

BACKGROUND

This disclosure relates generally to data security and in particular to protection of secrets (such as data encryption keys) during use by containerized applications.

Electronic transactions (including but not limited to financial transactions) may require data security. In typical security protocols for electronic communications, the systems that are participating in a transaction have data encryption keys (e.g., a private key of a public/private key pair or a session key) that should not be shared with any other device. Data encryption keys (sometimes referred to as "DEKs") can be persistently stored in hardware security modules or other key storage systems that are readable only by authorized processes on a computer system. In order to use a data encryption key, however, the authorized process needs to load the data encryption key into system memory so that the key is accessible to the authorized process.

System memory for a given processor is not necessarily secure, and a hacker may be able to insert malicious code into the processor that reads system memory locations where data encryption keys are stored, allowing the hacker to obtain secret information. Accordingly, it is desirable to secure data encryption keys (and other sensitive data) during use.

SUMMARY

Certain embodiments relate to systems and methods that enable a key protection service to execute in a secure virtual machine environment.

Some embodiments relate to methods implemented in a virtual machine that executes program code in a processor of a computer system. For instance the method can include: receiving a request to access a data encryption key from a client application (also referred to as a "client app") via an application program interface executing in the virtual machine; connecting to a key storage system via an attestation client executing in the virtual machine to request the data encryption key; receiving an attestation challenge from the key storage system; generating a response to the attestation challenge, wherein the response includes a data block generated by the processor based on the program code being executed in the virtual machine; sending the response to the key storage system; receiving the data encryption key from the key storage system; storing the data encryption key in a secured memory area of the virtual machine; and using the data encryption key to respond to a subsequent request received from the client app via the application program interface.

Some embodiments relate to a computer system. The computer system can include: a secure memory to store program code and data; a communication interface to communicate with one or more client applications; and a processor coupled to the secure memory and configured to execute the stored program code. The stored program code can include a virtual machine compatible with the Open Container Initiative, and the virtual machine can include: a first module exposing an application program interface for a client application; a second module implementing a set of key-using functions that are invocable via the client application program interface; and a third module implementing an attestation client configured to communicate with a key storage system to request execution of a key-management operation (such as retrieving, updating, creating, or deleting a key) and to store one or more data encryption keys received from the key storage system in response to the request. In some embodiments, the key storage system can include a secure key storage device (such as a hardware storage module or a data vault) and a key management service coupled to the secure key storage device, with the key management service being configured to: receive a request to perform the key-management operation from the attestation client, the request including credentials of a client app; determine, based on an authorization policy stored in the secure key storage device, whether the client app is authorized to perform the requested key-management operation; generate an attestation challenge to the attestation client only if the client app is authorized to perform the requested key-management operation; receive a response to the attestation challenge from the attestation client; and perform the requested key-management operation only if the response to the attestation challenge is accepted.

The following detailed description, together with the accompanying drawings, will provide a better understanding of the nature and advantages of the claimed invention.

TERMS

Figure 1:
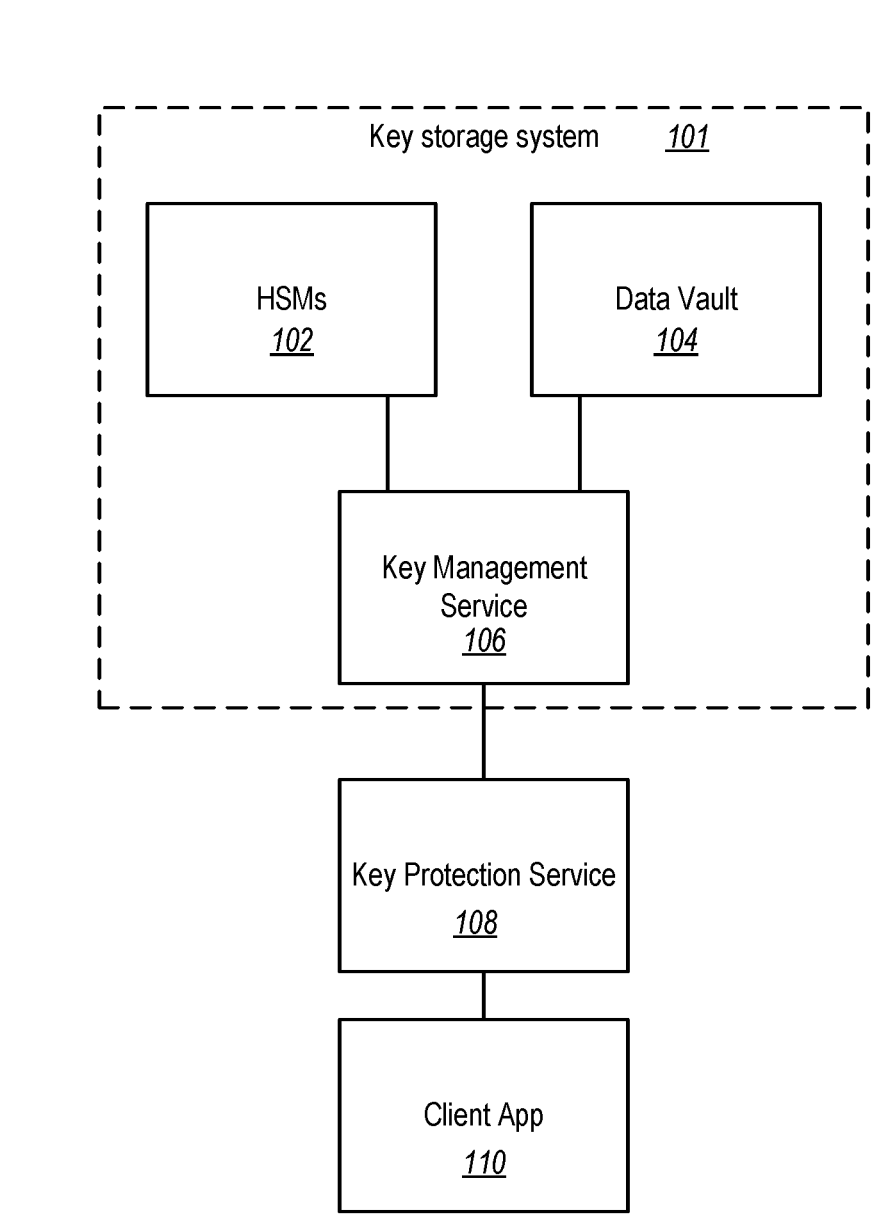
FIG. 1 shows a simplified block diagram of a computer environment in which embodiments of the invention can be practiced.

The following terms may be used herein.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "client" or "client computer" may include a computer system or other electronic device that communicates with a server computer to make requests of the server computer and to receive responses. For example, the client can be a laptop or desktop computer, a mobile phone, a tablet computer, a smart speaker, a smart-home management device, or any other user-operable electronic device. A client can also be a larger computer system, and a given computer system may act as both a server and a client at various times.

A "memory" may include suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Ryzen, and/or EPYC processors; IBM and/or Motorola's PowerPC; IBM's and Sony's Cell processor; Intel's Celeron, Pentium, Xeon, and/or Core processors; and/or other commercially available processor(s). A processor can implement security features such as a secure virtual machine environment in which data and code associated with processes executing on the secure virtual machine cannot be read (or written) by any other process executing on the processor.

A "communication device" may include any electronic device that may provide communication capabilities including communication over a mobile phone (wireless) network, wireless data network (e.g., 4G, 5G, or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, hand-held specialized readers, wearable devices (e.g., watches), vehicles (e.g., cars), etc. A communication device may comprise any suitable hardware and software for performing such functions, and may also include multiple devices or components (e.g., when a device has remote access to a network by tethering to another device—i.e., using the other device as a relay—both devices taken together may be considered a single communication device).

An "encryption key," or "data encryption key" (sometimes abbreviated "DEK"), may include any data value or other information suitable to cryptographically encrypt data. A "decryption key" may include any data value or other information suitable to decrypt encrypted data. In some cases, the same key used to encrypt data may also be usable to decrypt the data. Such a key is referred to as a "symmetric encryption key."

The term "public/private key pair" (also referred to as a "key pair") may include a pair of linked cryptographic keys generated by or provided to an entity (e.g., a computer, communication device, or other electronic device) that "owns" the key pair. A public/private key pair may be used with an asymmetric encryption algorithm so that data encrypted using the "public" key of the pair can be decrypted using the "private," or "secret," key of the pair (and vice versa). The public key of a key pair may be provided to other entities and used for public functions such as encrypting a message to be sent to the owner of the key pair or for verifying a digital signature that was purportedly generated by the owner of the key pair. The public key is typically authorized or verifiable by a body known as a Certification Authority (CA), which stores the public key in a database and distributes it to any entity that requests it. The private, or secret, key is typically stored in a secure storage medium and known only to the owner of the key pair. It should be understood that some cryptographic systems may provide key recovery mechanisms for recovering lost secret keys and avoiding data loss.

A "static key pair", also referred to as a "persistent key pair," may include a public key (a "static public key" or "persistent public key") and a secret key (a "static secret key" or "persistent secret key") that are maintained by an entity over a period of time and may be reused across different transactions or other communication sessions with different entities. Typically, though not necessarily, a static secret key may be stored securely, e.g., in a hardware security module (HSM) or secure element (SE) that may require a password or other form of authorization (beyond mere possession of the device that stores the static secret key) to enable access to the static secret key. A static public key may be bound to an identity through the use of a digital certificate.

A "secure key storage device" refers to a computer system or device that securely and persistently stores secret keys. Examples of key storage systems include HSMs or data vaults that restrict access to authorized processes or entities and that require some form of attestation or authentication to verify that a requester should be granted access to the requested information.

A "digital signature" may refer to the result of applying an algorithm based on a public/private key pair (typically a static key pair), which allows a signing entity (or "prover") to manifest, and a verifying entity (or "verifier") to verify, the authenticity and integrity of a message or document. The prover acts by applying the private key to encrypt the message, and the verifier acts by applying the public key to decrypt the encrypted message. On the assumption that only the prover has the private key, the verifier's ability to decrypt the message can be treated as authentication of the signer's identity and of the integrity of the message or document. A certificate or other data that includes a digital signature of a signing entity is said to be "signed" by the signing entity.

A "certificate" or "digital certificate" may include an electronic document or data file that uses a digital signature to bind a static public key with other data associated with an identity. The certificate may include various data fields, such as a legal name of the identity, a serial number of the certificate, a range of valid dates for the certificate (e.g., issue and expiration dates), a public key, message digest algorithms used when creating digital signatures, certificate-related permissions, etc. A certificate may also contain a hash of the data in the certificate including the data fields. A certificate is typically signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key or by the same CA's private key (a "self-signed" certificate). The CA may maintain a database of all certificates issued by the CA and may also maintain a list of revoked certificates. In a typical process, the CA receives an unsigned certificate from an entity whose identity is known to the CA. The unsigned certificate includes a public key of the entity, one or more data fields, and a hash of the data in the certificate. The CA signs the certificate with a private key corresponding to the public key included in the CA certificate. The CA may then store the signed certificate in a database and issue the signed certificate to the entity. In some cases, a CA may, upon request, provide a copy of a signed certificate from its database to an entity that requests it.

A "shared secret" may include any data value or other information known only to authorized parties in a secure communication. A shared secret can be generated in any suitable manner, from any suitable data, including a Diffie-Hellman-based algorithm such as Elliptic-Curve Diffie-Hellman (ECDH) may be used.

A "session key" may include any key that is generated during a communication session to encrypt and/or decrypt data communicated between participants in the communication session. A session key can be generated, for example, from a shared secret known to both parties to the secure communication session. For example, a session key may be derived using a key derivation function and the shared secret. In some instances, the session key is a symmetric encryption key, although this is not required and a session key may include an encryption key and a corresponding decryption key.

A "nonce" (or "cryptographic nonce") may include any number, string, bit sequence, or other data value intended to be used in association with a single communication session. In some cases, a nonce may be randomly or pseudo-randomly generated. Typically, a nonce is of sufficient length (or size) as to provide an insignificant likelihood of independently generating the same nonce value multiple times.

A "key management service" may include a process or group of processes executing on a server that manages cryptographic keys on behalf of one or more clients. For example, the key management service can interact with a secure key storage device to verify identity and access policies and to retrieve a key associated with a particular client and provide a key to the client. A key management service can provide a secure mechanism for retrieving keys from a secure key storage device with minimal effect on system performance. In some embodiments, the key management service may handle "wrapped" keys so that the actual keys are known only to the key storage system and the client. A key management service can implement a key management server protocol such as the Key Management Interoperability Protocol ("KMIP") governed by the OASIS standards body.

A "key protection service" may include a computer-implemented process or group of processes that allows a client application to use data encryption keys while protecting the keys against exposure. For instance, the key protection service can be executed in a protected environment (examples of which are described below) on the same processor or in the same computer system that executes the client application. The key protection service can expose an application program interface ("API") that the client can invoke to perform functions such as key retrieval, encryption, decryption, and/or hashing without the client needing to store the keys in its allocated memory. In some implementations, a key protection service can interact with a key management service to export keys from a key storage system and securely store the keys on behalf of the client. For instance, a key protection service can implement the client side of a key management protocol such as KMIP.

DETAILED DESCRIPTION

The following description of exemplary embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

Embodiments described herein relate to systems and methods for securing data encryption keys (and other sensitive data) during use, particularly in the context of a key protection service that performs key-using operations (including cryptographic operations) on behalf of a client application. It is assumed that data encryption keys associated with a particular client application are persistently stored in a secure key storage system (e.g., hardware security module, data vault). On request of a client application, the key storage system can provide access to keys associated with that client application. In some embodiments, access to the key storage system can be managed by a key management service executing on a server computer, and the client application can be executing on a different computer system from the key management service. To protect data encryption keys during use, the client application can use a key protection service, which can be executing on the same computer system as the client application or on a different system. The key protection service can request keys on behalf of a client application from the key management service, store the keys in its allocated memory, and perform all operations that use the keys, including encryption or decryption of messages. In some implementations, the client application does not receive or store the keys at any time.

As noted, while the key protection service is using a key, the key can be stored in system memory of the processor that executes the key protection service. It is desirable to secure the portion of system memory that stores the keys against attempts by other processes on the same processor to read the key. At the same time, the key protection service should also comply with security requirements of the key storage system, such as providing attestation or verification that the key protection service is executing within a secure environment (as evidenced using a cryptographic attestation process) and has not been compromised.

FIG. 1 shows a high-level view of a computing environment 100 in which embodiments of the invention can be practiced. Environment 100 includes a key storage system 101, which can include one or more secure key storage devices, such as one or more hardware storage modules ("HSM") 102 and/or one or more data vaults 104, as well as a key management service 106; a key protection service 108; and a client app 110. HSMs 102 can be of generally conventional design and can include a memory subsystem and a cryptographic processor mounted to a printed circuit board that provides input and output ports. The memory subsystem can be used for persistent, secure storage of data encryption keys (e.g., the private, or "secret," key of a public/private key pair) and associated authorization policies that define requirements for accessing the stored data encryption keys (e.g., digital certificates or other identifiers of specific client apps that are authorized to retrieve or modify specific keys). The cryptographic processor can be programmed (or hardwired) to perform cryptographic operations, such as verifying the identity of an application or service that requests a key and validating any authorization policies that may be in place for key accesses, encrypting or decrypting messages using the appropriate key, etc. Each HSM 102 is protected by hardware features. (For instance, the processor, once programmed, may not be reprogrammable.) Data vault 104 can be a proprietary system for securely storing data encryption keys and associated authorization policies and may or may not incorporate additional HSMs; suitable implementations are known in the art. HSM 102 and data vault 104 are examples of secure key storage devices that can be used for secure storage of keys and other data, and other secure key storage devices can also be used.

Key management service 106 can provide a unified interface for client systems to communicate with HSMs 102, data vault 104, and/or other secure key storage devices that may be included in key storage system 101. Key management service 106 can implement a key management server protocol such as the Key Management Interoperability Protocol ("KMIP") and can act as a proxy for secure key storage devices such as HSMs 102 and/or data vault 104. It is contemplated that key management service 106 may provide services to a large number of client systems and/or handle a high volume of requests and that key management service 106 can be implemented on a server or server farm. In some embodiments, HSMs 102, data vault 104, and/or other secure key storage devices that may be included in key storage system 101 can provide keys to key management service 106 in a wrapper such that the key is not readable by key management service 106.

Client application (also referred to as "client app") 110 can be implemented as software executing on any suitable processor. Client app 110 in this example uses cryptographic keys stored in key storage system 101 without storing the keys within its assigned memory. Instead, client app 110 uses the keys via key protection service 108.

Key protection service 108 can provide an application program interface ("API") that allows client app 110 to use securely stored keys associated with the client app (the keys may be stored in HSMs 102, data vault 104, and/or other secure key storage devices) without client app 110 storing the keys. For instance, key protection service 108 can implement the client side of a key management protocol such as KMIP to communicate with key management service 106 to retrieve stored keys, and key protection service 108 can implement cryptographic operations including encryption and decryption using keys retrieved from key management service 106. Accordingly, client app 110 can invoke API function calls to encrypt or decrypt messages without storing the keys within its assigned memory and without knowing exactly where the keys are stored within key storage system 101. In some embodiments, key protection service 108 and client app 110 are local to each other (e.g., executing on the same processor or within the same computer system) while key management service 106 executes on a server computer system. Key protection service 108 can communicate with a server executing key management service 106 directly, via a local area network, via a wide area network such as the internet, or via optimized and serialized communication protocols local to a server instance.

Figure 2:
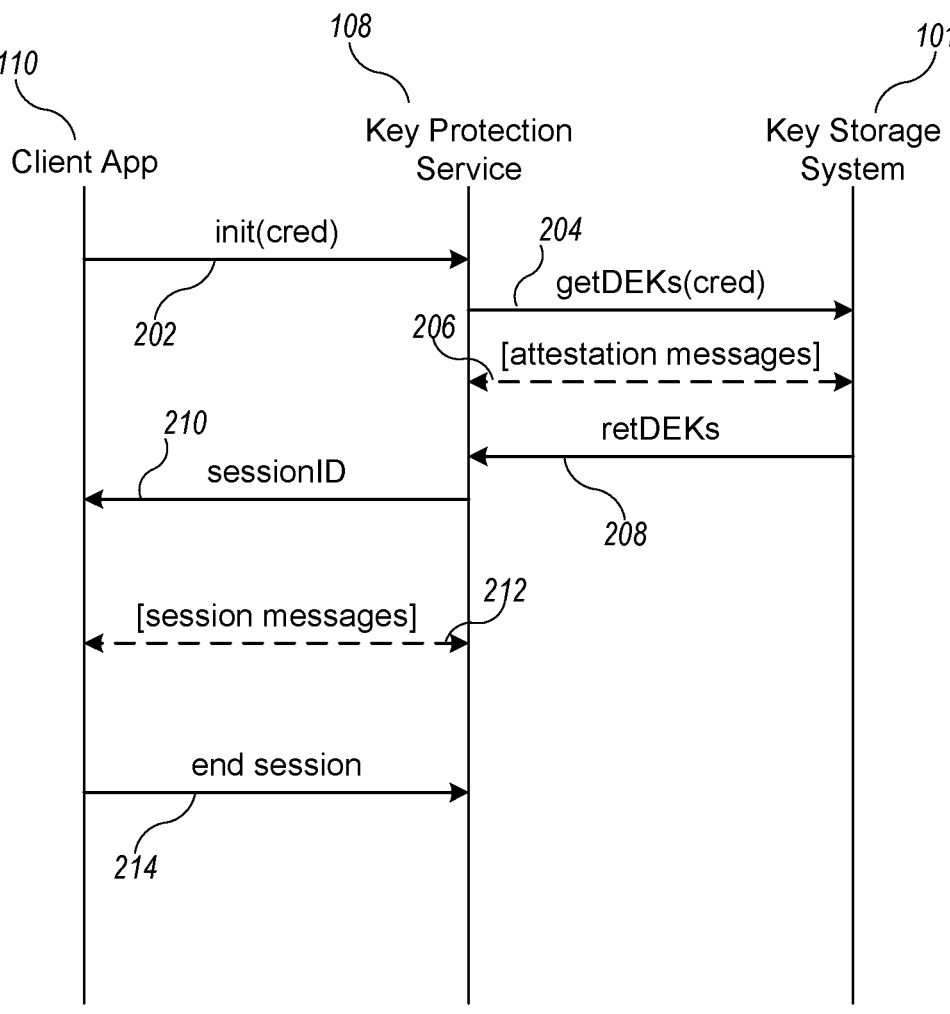
FIG. 2 is a simplified message-passing diagram showing an example of interactions of a client app, a key protection service, and a key storage system that can be supported according to some embodiments.

FIG. 2 is a simplified message-passing diagram showing an example of interactions of client app 110, key protection service 108, and a key storage system (e.g., key storage system 101) that can be supported according to some embodiments. An interaction can begin with client app 110 sending a request (message 202) to key protection service 108 to initialize cryptographic operations. The request can include credentials ("cred") for client app 110, such as a digital security certificate. Key protection service 108 can send a request (message 204) to key storage subsystem 101

(e.g., to key management service 106) to retrieve one or more data encryption keys (DEKs) associated with the provided credential (cred). Key storage subsystem 101 can validate the credential and return the DEKs to key protection service 108 (message 208). In some embodiments, key storage subsystem 101 can require key protection service 108 to answer an attestation challenge (indicated generally by attestation messages 206) prior to providing the keys at message 208. Examples of attestation are described below. Key protection service 108 can locally cache the DEKs in association with a session identifier, and at message 210, key protection service 108 can provide the session identifier to client app 110. Key protection service 108 in this example does not provide the DEKs to client app 110. Instead, client app 110 can instruct key protection service 106 to use the DEKs to encrypt or decrypt messages by sending appropriate requests (session messages 212). When cryptographic activity is completed, client app 110 can end the session (message 214), and key protection service 108 can clear the DEKs from its cache.

In some embodiments, a key management service (e.g., key management service 106) may provide additional security by controlling access to secure key storage devices such as HSMs 102 or data vault 104. For example, a key management protocol can define a number of key-management operations, such as retrieving (or fetching) a key from a secure key storage device (e.g., from HSM 102 or data vault 104), updating a stored key, deleting a stored key, and/or creating and storing a new key. A secure key storage device (such as HSM 102 or data vault 104) may authorize or prohibit various operations based on the client's identity, and key management service 106 can communicate with the secure key storage device to determine whether a particular key-management operation requested by a particular client app is authorized.

Figure 3:
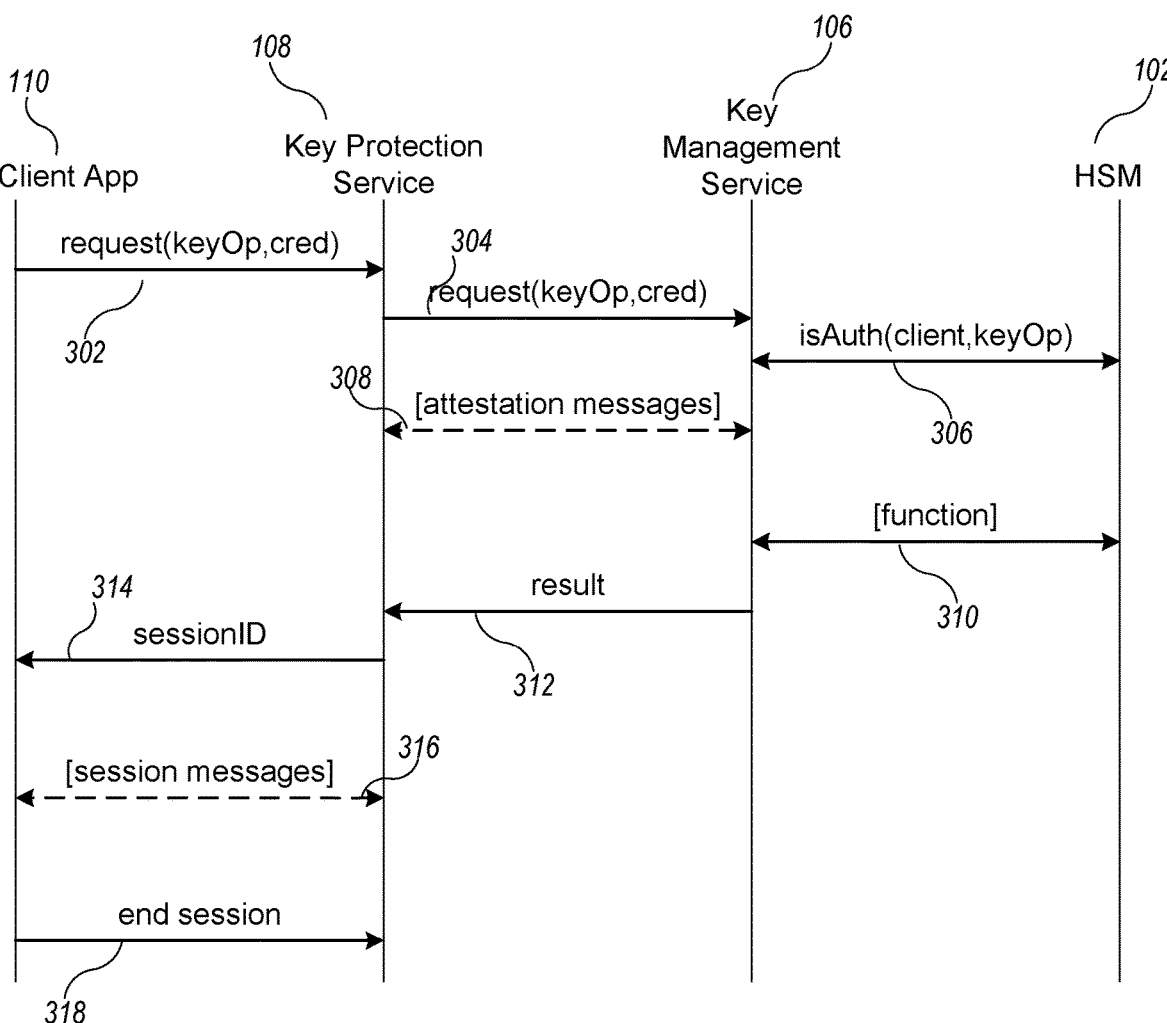
FIG. 3 is a simplified message-passing diagram showing an example of interactions of a client app, a key protection service, a key management service, and a secure key storage device that can be supported according to some embodiments.

FIG. 3 is a simplified message-passing diagram showing an example of interactions of client app 110, key protection service 108, key management service 106, and a secure key storage device (in this example, HSM 102) that can be supported according to some embodiments. An interaction can begin with client app 110 sending a request (message 302) to key protection service 108 to perform a key-management operation. The request can include credentials ("cred") for client app 110, such as a digital security certificate and a key-management operation ("keyOp") to be performed, such as retrieving, updating, deleting, or creating a data encryption key (or other type of key). Key protection service 108 can send a request (message 304) to key management service 106 to perform the key-management operation; the request can include the credentials of client app 110. Key management service 106 can communicate with HSM 102 to confirm that client app 110 is authorized to perform the requested key-management operation, e.g., by exchanging "isAuth" message(s) 308. If client app 110 is not authorized, the request can be denied (not shown in FIG. 3). If client app 110 is authorized, then key management service 106 can require key protection service 108 to answer an attestation challenge (indicated generally by attestation messages 308). Examples of attestation are described below. If attestation is successful, key management service 106 can perform the requested function with HSM 102 (indicated generally by function messages 310). Upon completion, key management service 106 can provide a result to key protection service 108 (message 312). Depending on the particular function, the result can include one or more retrieved DEKs, one or more new DEKs, one or more updated DEKs, or the like.

Key protection service 108 can locally cache received DEKs in association with a session identifier, and at message 314, key protection service 108 can provide the session identifier to client app 110. Key protection service 108 in this example does not provide the DEKs to client app 110. Instead, client app 110 can instruct key protection service 106 to use the DEKs to encrypt or decrypt messages by sending appropriate requests (session messages 316). When cryptographic activity is completed, client app 110 can end the session (message 318), and key protection service 108 can clear the DEKs from its cache. In some embodiments, key management service 106 can also locally cache DEKs in a protected memory, and caching of DEKs can improve response time. In some embodiments, key management service 106 can repeat the authorization and attestation processes for each requested key-management operation. Other implementations may be used, depending on the level of security desired.

In the examples described above, key protection service 108 receives and caches DEKs. To protect the DEKs, it may be desirable for key protection service 108 to be executed within an environment that prevents the cached DEKs from being read by any other processes.

Some existing processors are designed to support the creation of a secure execution environment for a process. One example is the Secure Guard Extensions ("SGX") technology supported by various Intel processors. Intel SGX defines a hardware instruction to assign a secure region (or "secure enclave") within system memory to a specific ("secured") process. The secured process uses the secure enclave to store all data and program instructions that it uses. By design of the hardware, any other process executing on the same processor (including operating-system kernel processes) is blocked by hardware from reading from or writing to the secure enclave. For instance, an SGX-enabled processor encrypts all data and instructions stored in the secure enclave (using a hardware-derived key) and decrypts the data and instructions on the fly during execution of the instructions stored in the secured enclave. In this manner, the secure enclave is secured against malicious code executing on the processor. To allow other processes to interact with the secured process, the secured process can present an application program interface (or "API") to one or more "client" processes that run outside the secure enclave. (A client process might run in a different secured enclave or as an unsecured process, or on a different processor entirely.) Intel SGX also supports an attestation capability that can be used by processes outside the enclave to verify that the secured process is running within a secure enclave and that the secure enclave contains the correct (or expected) program code, thereby providing verification that the DEKs protected by these enclaves will not be copied to unprotected memory or otherwise read by the client process (or any other process).

Accordingly, the environment of FIG. 1 and the interaction sequence of FIG. 2 can be implemented using Intel SGX. In particular, key protection service 108 can be implemented as a process running in a secure enclave on an SGX-enabled processor. HSMs 102 and/or data vault 104 can use the SGX attestation capability to establish trust with key protection service 108 prior to responding to a request for a DEK. It is also noted that Intel's SGX technology is compatible with containerized applications. Thus, for instance, key protection service 106 can be provided as a containerized application, e.g., using Kubernetes. (Kubernetes is an existing open-source platform for managing containerized apps and is used herein as an example; other platforms can be substituted.) Containerization can facilitate large-scale deployment of a key protection service alongside client applications that may also rely on Kubernetes orchestration technology.

Instead of a secure enclave that executes a single application, some microprocessors implement chip-level security using virtual machines ("VMs"). For example, AMD's Secure Encrypted Virtualization ("SEV") technology supports creation of a secure VM, in which all data and program code associated with the secure VM is protected from access by any process executing outside the secure VM. As compared to a secure enclave, however, a secure VM poses additional challenges related to interactions with other processes that are desirable for a key protection service. For example, as described above, key storage system 101 may require attestation that key protection service 108 is executing within a secure VM and that key protection service 108 is executing the correct (expected) program code. In addition, a VM differs from a containerized app in that a VM includes a kernel, drivers, and code implementing or emulating other aspects of a computing platform, in addition to application code. In some applications, the ability to select a kernel version for a VM can be beneficial.

According to some embodiments, a secure VM, such as a VM secured by AMD SEV technology, can be used to implement a containerized key protection service that, to client apps, can appear indistinguishable from a key protection service using a secure enclave such as Intel's SGX technology.

Figure 4:
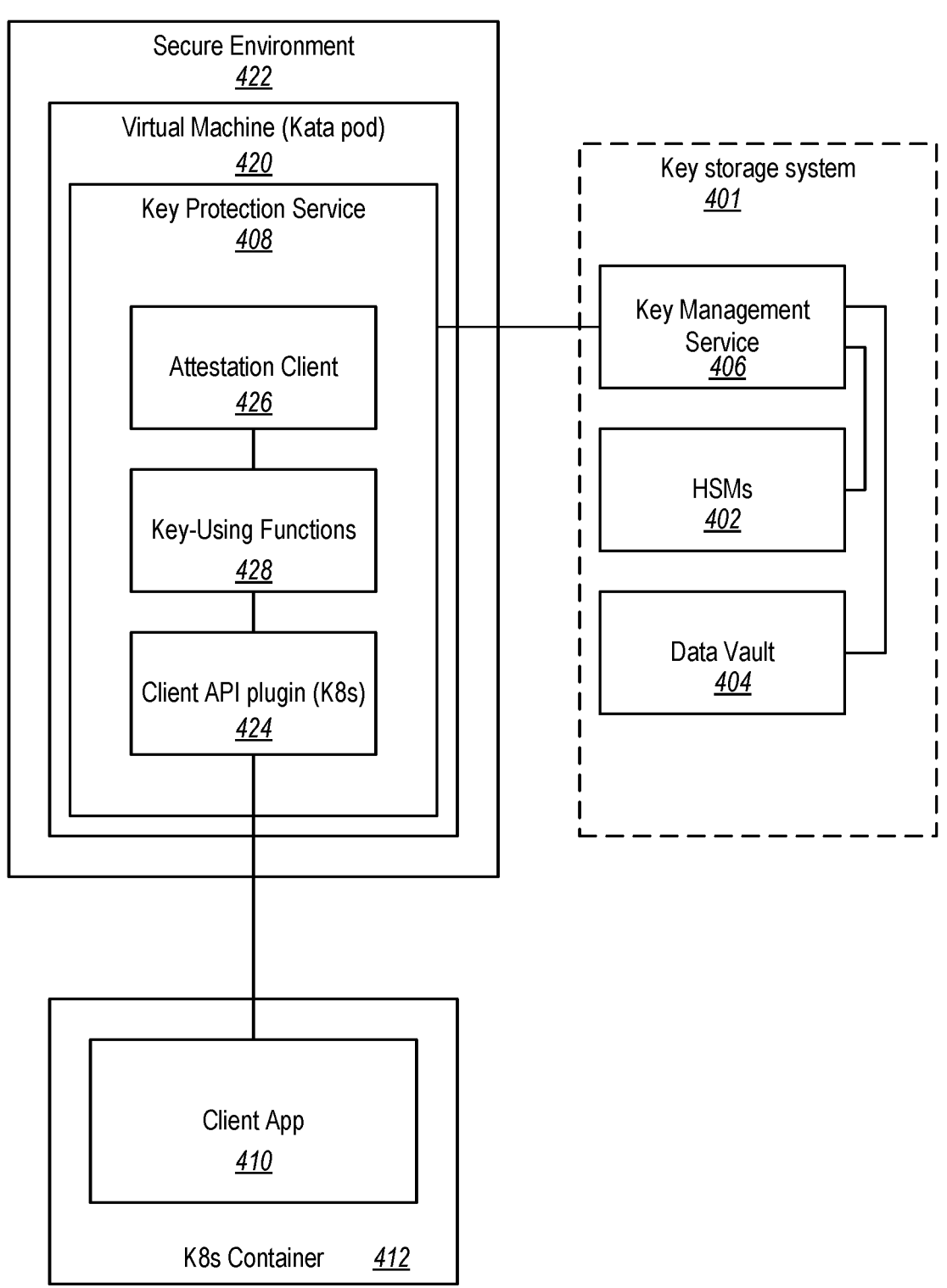
FIG. 4 is a simplified block diagram showing an implementation of a key protection service using a containerized secure VM according to some embodiments.

FIG. 4 is a simplified block diagram showing an implementation of a key protection service using containers and a secure VM according to some embodiments. Key storage system 401, including HSMs 402 and/or data vault 404, as well as key management service 408, can be similar or identical to key storage system 101 described above. Client app 410 can be similar or identical to client app 110 described above. In this example, client app 410 is implemented in a Kubernetes (also referred to as "K8s") container 412.

Key protection service 408 is implemented as a secure VM 420 that executes within a secure environment 422 such as AMD SEV. In some embodiments, secure VM 420 can be implemented using Kata Containers. (Kata Containers is an open-source project to provide lightweight virtual machines that appear externally as containers. Other implementations compatible with the Open Container Initiative (OCI) can also be used.) For instance, secure VM 420 can be implemented as a Kata pod that includes modules that expose a client API 424 and an attestation client 426, and that also includes an application code module that implements key-using functions 428 (e.g., functions that use data encryption keys, such as encryption, decryption, or hashing).

Client API 424 can provide an API similar or identical to the API of key protection service 108 described above and can enable client 410 to invoke key-using functions 428. Thus, in some embodiments client app 410 can interact with key protection service 408 in the same manner as described above for key protection service 108. In some embodiments, client API 424 can be exposed as a K8s device plugin by the Kata pod that implements secure VM 420. This approach allows key protection computations to be scheduled locally to client app 410.

Attestation client 426 provides support for attestation operations that may be required by key storage system 401 (e.g., by key management service 406 acting as a proxy for HSM 402 and/or data vault 404). As described above, attestation can include verifying that key protection service 408 is executing as a secure VM within secure environment 422 and that key protection service 408 is executing the correct (expected) code. In some embodiments, attestation can leverage attestation capabilities available via AMD SEV-SNP (SEV with Secure Nested Paging) technology.

For instance, when secure VM 420 is launched on an AMD processor that implements SEV-SNP, the processor generates a launch digest based on the unencrypted image of secure VM 420 as actually installed in system memory and the locations (memory pages) where the image is installed. The process that launches secure VM 420 can provide an identity block for secure VM 420 that includes an "expected" launch digest (based on the code that secure VM 420 is expected to include). When attestation is requested (e.g., by key management service 406), secure VM 420 can obtain an attestation report from the processor on which secure VM 420 is executing. The attestation report can include the launch digest generated by the processor and optionally other information such as a public key for secure VM 420. Secure VM 420 can provide the attestation report to the requester (e.g., via attestation client 426) over a secure connection, e.g., KMIP. The requester can compare the attestation report to the identity block and can verify that secure VM 420 is executing as a secure VM in the SEV-SNP environment and that secure VM 420 is running the correct (expected) code. In some embodiments, attestation client 426 can be implemented using a Kata container.

Figure 5:
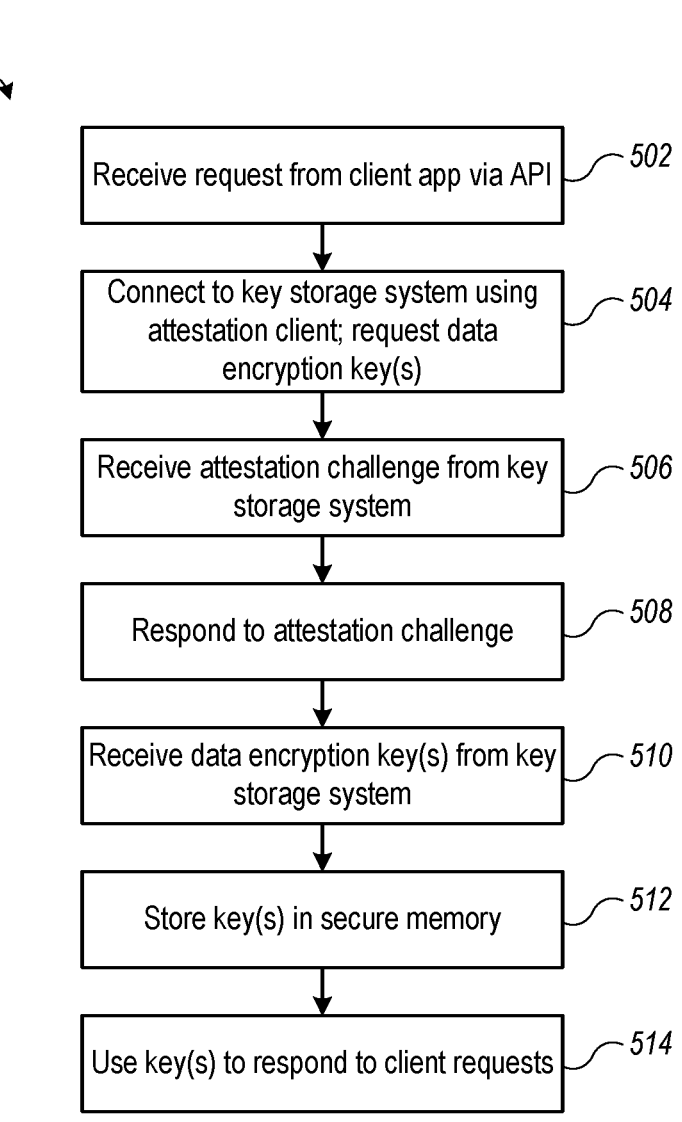
FIG. 5 is a flow diagram of a process for obtaining data encryption keys according to some embodiments.

FIG. 5 is a flow diagram of a process 500 for obtaining DEKs according to some embodiments. Process 500 can be implemented, e.g., in secure VM 420. At block 502, secure VM 420 can receive a request to retrieve DEKs from client app 410, e.g., via client API plugin 424. At block 504, secure VM 420 can connect to a key storage system (e.g., to key management system 408 acting as proxy for HSM 402 or data vault 404), e.g., using attestation client 426, and request the DEKs. At block 506, secure VM 420 can receive an attestation challenge from the key storage system, e.g., via attestation client 426. At block 508, secure VM 420 can respond to the attestation challenge via attestation client 426. For instance, as described above, secure VM 420 can obtain an attestation report from the processor on which secure VM 420 is executing and can deliver the attestation report to the key storage system. In some embodiments, secure VM 420 can add other information to the attestation report, digitally sign the attestation report, or perform other operations to further establish trust with the key storage system.

Based on the attestation report, the key storage system can determine whether to accept the response. Depending on implementation, the key storage system can perform various operations including verifying a digital signature on the attestation report. In some embodiments, the key storage system can maintain a database of valid attestation information for specific implementations of a key protection service on various platforms. Examples of information that can be stored in the database include SGX enclave hashes, secure VM launch digests, or other comparable information representing the correct (expected) code. A key storage system can compare information in the received attestation report to information in the database as part of determining whether to accept the response to the attestation challenge.

Assuming that the response to the attestation challenge is accepted by the key storage system, then at block 510, secure VM 420 can receive the DEKs from the key storage system. At block 512, secure VM 420 can store the DEKs in secure memory, e.g., in association with a session identifier as described above. At block 514, secure VM 420 can use the stored DEKs to respond to requests from client 410, such as requests to encrypt or decrypt data. Requests can be received via client API plugin 424, which can invoke appropriate key-using functions 428 to service the client requests.

Figure 6:
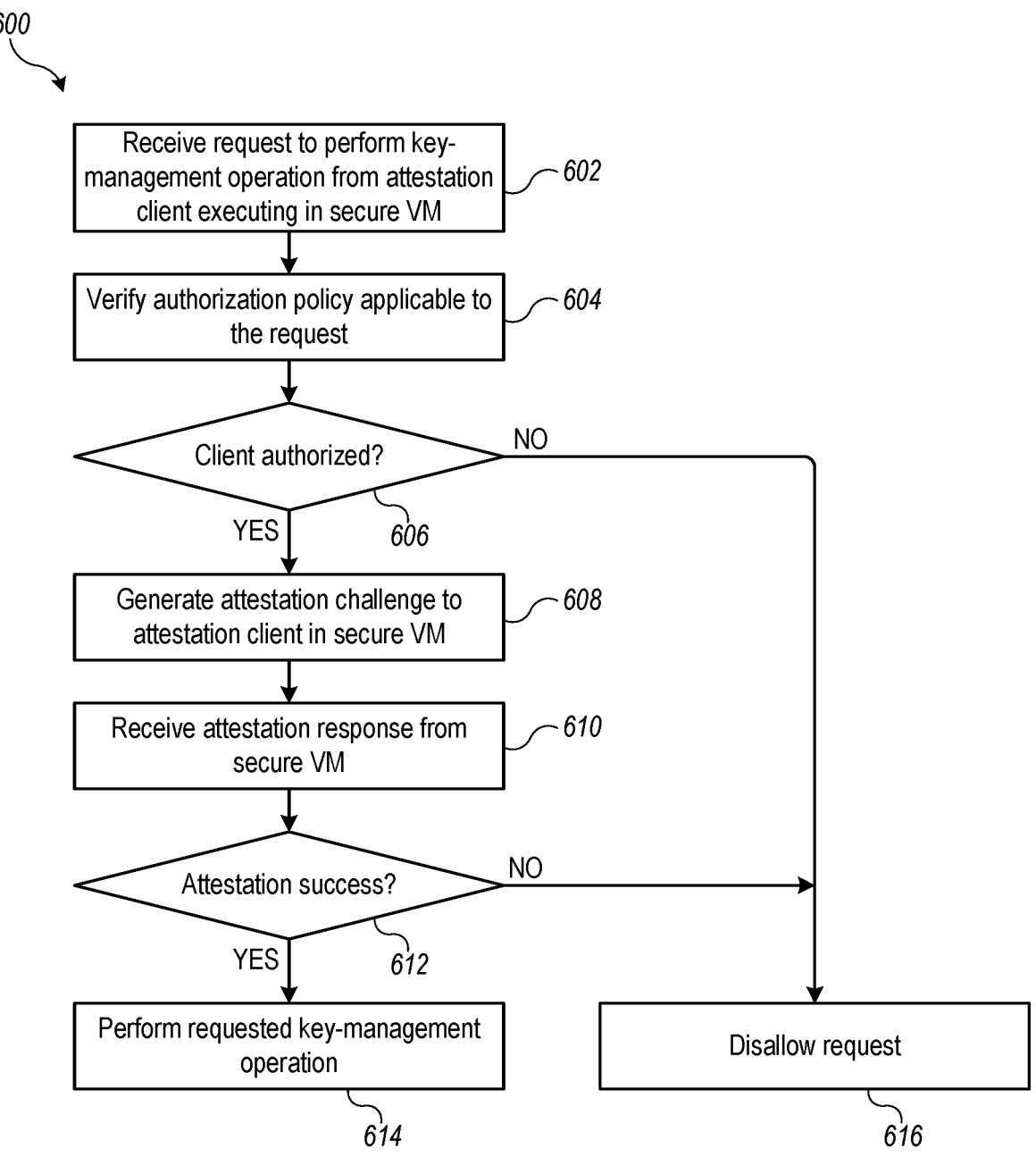
FIG. 6 is a flow diagram of a process that can be implemented in a key management service according to some embodiments.

In some embodiments, a key management service (e.g., key management service 406) can provide enhanced security and functionality. For instance, in addition to fetching (or retrieving) keys stored in a secure key storage device (e.g., HSMs 402 or data vault 404), key management service 406 can perform other key-management operations, such as updating a key, deleting a key, or creating a new key. As noted above, such operations may be authorized or not, depending on the particular client application. FIG. 6 is a flow diagram of a process 600 that can be implemented in a key management service such as key management service 406 according to some embodiments. At block 602, key management service 406 can receive a request to perform a key-management operation from a key protection service, e.g., key protection service 408 executing in secure VM 420. The request can be a request to retrieve a key (as in process 500), or a request to perform another operation such as updating, deleting, or creating a key, and the request can be made on behalf of a specific client app (e.g., client app 410). At block 604, key management service 406 can verify the authorization policy applicable to the request, e.g., by communicating with a secure key storage device (e.g., HSMs 402 or data vault 404), where authorization policies may be stored. At block 606, key management service 406 can determine, based on the authorization policy, whether the client app is authorized to perform the requested key-management operation. If so, then key management service 406 can proceed with attestation of key protection service 408. For instance, as described above, at block 608, key management service 406 can generate an attestation challenge to attestation client 426, and at block 610, key management service 406 can receive a response to the attestation challenge from attestation client 426. At block 612, key management service 406 can determine whether the attestation succeeded, e.g., as described above. If the attestation succeeded, then at block 614, key management service 406 can perform the requested operation. On the other hand, if, at block 606, it is determined that the client app is not authorized to perform the requested operation or if, at block 612, the attestation fails, then at block 616, key management service 406 can disallow the request. Depending on implementation, disallowing the request can include returning an error message indicating the reason for disallowing (e.g., client app not authorized or attestation failed). In some embodiments, in addition to disallowing the request, key management service 406 may also disallow further communication from a particular client app or key protection service (e.g., if too many authorization failures occur or if an attestation failure occurs). In process 600, authorization of the client app is determined prior to attestation of the key protection service; if the client app is not authorized to perform the operation, then attestation of the key protection service is not needed.

Using processes described above, a key protection service can be implemented using a processor that supports a secure VM. From the client's perspective, a key protection service executing within a secure VM (such as a secure VM supported by AMD SEV) can be identical to a key protection service executing in a different environment (such as a secure enclave supported by Intel SGX). This increases the ability of a provider of a key protection service to deploy the service across different platforms or to migrate to a different platform without requiring clients to be updated.

In examples described above, the secure VM can be implemented using a Kata container (or pod). A Kata pod provides a lightweight virtual machine that can appear as a container to apps and processes executing outside the virtual machine. Other VM implementations that can appear as a container to apps and processes executing outside the virtual machine can be substituted. Likewise, Kubernetes is referenced above as an example of a container management platform, but other platforms can also be used.

Virtual machines and other applications, containers, and processes described herein can be implemented using program code that is executable on a computer system. A computer system can include one or more microprocessors (e.g., AMD microprocessors supporting SEV technology, Intel processors, etc.), one or more memory or storage devices (e.g., registers, DRAM, SRAM, flash memory, magnetic or optical storage devices), and optionally user interface components (e.g., display, keyboard, mouse, touchpad, touch screen, microphone, speakers). These and other components or subsystems can be connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components. Computer systems can be implemented in a variety of form factors and devices ranging from server farms to desktop or laptop computers to special purpose devices such as point-of-sale (POS) terminals to mobile devices such as smart phones, tablets, or wearable devices. In some embodiments, a microprocessor that executes processes and virtual machines providing a key protection service can be part of a server, which may include many microprocessors executing different instances of the same program code.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Rust, Golang, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network.

Any of the methods described herein may be totally or partially performed with a computer system including one or more processors, which can be configured (e.g., via suitable program code) to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

Embodiments described herein provide key protection services using a secure virtual machine. Such techniques can be implemented in any context where a key protection service is to be provided to one or more clients, including but not limited to large-scale services that support large numbers of clients and/or high volume of requests. The specific details of particular embodiments may be combined in any suitable manner without departing from the spirit and scope of embodiments of the invention. However, other embodiments of the invention may be involve specific embodiments relating to each individual aspect, or specific combinations of these individual aspects.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A method implemented in a virtual machine that executes program code in a processor of a computer system, the method comprising:

receiving a request to access a data encryption key from a client app via an application program interface executing in the virtual machine;

establishing a secure connection between a key storage system and an attestation client executing in the virtual machine;

requesting, by the attestation client, via the secure connection, the data encryption key from the key storage system;

receiving, by the attestation client, via the secure connection, an attestation challenge from the key storage system;

generating, by the attestation client, a response to the attestation challenge, wherein the response includes a data block generated by the processor based on the program code being executed in the virtual machine;

sending, by the attestation client, via the secure connection, the response to the key storage system;

receiving, via the secure connection, the data encryption key from the key storage system;

storing the data encryption key in a secured memory area of the virtual machine; and using the data encryption key to respond to a subsequent request received from the client app via the application program interface.

2. The method of claim 1 wherein the key storage system includes a key management service that generates the attestation challenge, determines whether the response to the attestation challenge succeeds, and retrieves the data encryption key from a secure key storage device only if the response to the attestation challenge succeeds.

3. The method of claim 2 wherein the key management service determines whether the client app is authorized to receive the data encryption key prior to generating the attestation challenge and wherein the attestation challenge is generated only if the client app is authorized to receive the data encryption key.

4. The method of claim 1 wherein the virtual machine is executed as a secure virtual machine.

5. The method of claim 4 wherein the data block generated by the processor includes a launch digest based on an unencrypted image of the secure virtual machine as installed in a system memory of the computer system.

6. A computer-readable storage medium having stored therein program code instructions that, when executed by a processor of a computer system, cause the computer system to perform a method comprising:

establishing a secure virtual machine in the computer system;

executing an application program interface within the secure virtual machine;

receiving a request to access a data encryption key from a client app via the application program interface;

establishing a secure connection to a key storage system by an attestation client executing in the virtual machine;

requesting the data encryption key by the attestation client via the secure connection;

receiving, by the attestation client, an attestation challenge from the key storage system via the secure connection;

generating, by the attestation client, a response to the attestation challenge, wherein the response includes a data block generated by the processor based on the program code being executed in the virtual machine;

sending, by the attestation client, via the secure connection, the response to the key storage system;

receiving, via the secure connection, the data encryption key from the key storage system;

storing the data encryption key in a secured memory area of the virtual machine; and using the data encryption key to respond to a subsequent request received from the client app via the application program interface.

7. The computer-readable storage medium of claim 6 wherein the key storage system includes one or more of a hardware storage module or a data vault.

8. The computer-readable storage medium of claim 6 wherein the processor supports creation of a secure virtual machine in which all data and program code associated with the secure virtual machine is protected from access by any process executing on the processor outside the secure virtual machine.

9. The computer-readable storage medium of claim 6 wherein the virtual machine is implemented as a pod that appears externally as a container.

10. The computer-readable storage medium of claim 9 wherein the application program interface is exposed as a device plugin by the pod.

11. The computer-readable storage medium of claim 6 wherein the data block generated by the processor includes a launch digest based on an unencrypted image of the secure virtual machine as installed in a system memory of the computer system.

12. The computer-readable storage medium of claim 6 wherein generating the response to the attestation challenge includes digitally signing the response.

13. A system comprising:

a secure memory to store program code and data;

a communication interface to communicate with one or more client applications; and a processor coupled to the secure memory and configured to execute the stored program code, wherein the stored program code includes a virtual machine compatible with the Open Container Initiative and the virtual machine includes:

a first module exposing an application program interface for a client application;

a second module implementing a set of key-using functions that are invocable via the client application program interface; and a third module implementing an attestation client configured to establish a secure connection with a key storage system to request execution of key-management operations; to receive and respond to attestation challenges from the key storage system, wherein the response to each attestation challenge includes an attestation report comprising a data block generated by the processor based on the program code being executed in the virtual machine; and to store, in the secure memory, one or more data encryption keys received from the key storage system responsive to execution of the key-management operation.

14. The system of claim 13 wherein the virtual machine is implemented as a pod that appears externally as a container.

15. The system of claim 14 wherein the application program interface is exposed as a device plugin by the pod.

16. The system of claim 13 wherein the processor supports creation of a secure virtual machine in which all data and program code associated with the secure virtual machine is protected from access by any process executing on the processor outside the secure virtual machine.

17. The system of claim 13 wherein the key storage system includes:

a secure key storage device including one or more of a hardware storage module or a data vault; and a key management service coupled to the secure key storage device and configured to:

receive a request to perform the key-management operation from the attestation client, the request including credentials of a client app;

determine, based on an authorization policy stored in the secure key storage device, whether the client app is authorized to perform the requested key-management operation;

generate an attestation challenge to the attestation client only if the client app is authorized to perform the requested key-management operation;

receive a response to the attestation challenge from the attestation client; and perform the requested key-management operation only if the response to the attestation challenge is accepted.

18. The system of claim 13 further comprising a system memory, wherein the attestation client is further configured such that the data block generated by the processor includes a launch digest based on an unencrypted image of the virtual machine as installed in the system memory of the system.

* * * * *